Patented Apr. 15, 1952

2,593,223

UNITED STATES PATENT OFFICE 2,593,223

CANNING OF HARD BOILED EGGS

Richard D. Trelease, Chicago, Ill., George O. Sampson, Larchmont, N. Y., and Dale V. Alstrand, Maywood, Ill.; said Sampson and said Alstrand assignors to American Can Company, New York, N. Y., a corporation of New Jersey No Drawing. Application November 3, 1948, Serial No. 58,162

24 Claims. (Cl. 99—161)

This invention relates to the canning of hard-boiled eggs.

Attempts have been made heretofore to preserve hard-boiled eggs by canning; however, such attempts have been unsuccessful because in the retorting operation necessary for the sterilization of the canned product, the sulphur-bearing proteins in the egg white are decomposed and hydrogen sulphide is formed. In addition to the offensive odor imparted by the thus formed hydrogen sulphide, there is a further disadvantage in that a reaction ensues between this objectionable compound and iron contained in the yolk, producing iron sulphide which imparts a green or black color to the yolk while the egg white is turned brown and the texture thereof impaired. Moreover, such eggs have a most unappetizing appearance.

It accordingly is an object of the present invention to provide a method whereby eggs can be canned for storage without refrigeration over a prolonged period in temperate and semi-tropical zones.

A further object of the invention is the treatment of hard-boiled eggs with edible acids or acidic buffer systems for the preparation of a product having superior storage qualities.

A further object of the present invention is a simple and efficient pretreatment of eggs prior to canning, which can be carried out even by unskilled workers and which is capable of being checked accurately by the use of conventional pH measurement methods.

Another object of the invention is to provide a method whereby shelled, hard-boiled eggs may be subjected to heat sterilization after closure in a hermetically sealed container, without serious impairment of the natural color, flavor or texture of the product.

These and other objects of our invention will become apparent as its description proceeds.

We have found in our investigations that by adjusting the pH of the white of hard-boiled eggs to between 5.0 and 7.0, a satisfactory canned product is obtained. The pH of the hard-boiled egg white may be conveniently measured by grinding it into a slurry with water, and measuring the pH of the slurry by conventional methods; this is possible because the hard-boiled egg white still has a very high proportion of water and a considerable amount of material in solution. After several months of canned storage at room temperature (say 70° F.) or elevated temperature (say 100° F.), the texture of the white is almost the same as that of a freshly boiled egg, the color of the white being not darkened to an objectionable extent; the color of the yolk is a natural yellow, and the flavor of the egg compares favorably with that of a freshly boiled egg.

There are several ways of adjusting the pH of the white of a hard-boiled egg in our method of canning. In one method, the eggs are shelled and soaked in a solution of an edible acid for a predetermined time, withdrawn from the solution, packed in a can and covered with boiling water, whereupon the can is sealed and heat-processed (e. g., at around 240° F. for about 50 to 60 minutes). Among suitable edible acids are citric acid, acetic acid, malic acid, tartaric acid, etc. Any edible acid will do, unless it is objectionable because of disagreeable flavor, odor, or similar characteristics. Another way to accomplish the object of our invention is to shell the eggs, place them into a can together with a solution of an edible acid as above defined, sealing the can and heat-process to sterilize the same, whereupon it is ready for storage. A further way of putting our invention into practice is to shell the eggs, subject them to acid treatment as above, place them in a can, cover them with cold water, evacuate and seal the can, heat-process to sterilize, and store. Instead of an edible acid, an acidic buffer system may be employed. Examples of suitable acidic buffer systems of an edible nature are:

(1) Citric acid—dibasic sodium phosphate.
(2) Potassium acid phosphate—di-sodium phosphate.
(3) Citric acid—sodium hydroxide.
(4) Acetic acid—sodium acetate.

The buffer system must be slightly more acid than the desired pH of the egg white, because the pH of the buffer changes slightly during the sterilization. For instance, if a pH of 6.0 is desired in the egg white, it would be necessary to employ a buffer of approximately 5.4; the pH of the above enumerated buffer systems ranges from 4.6 to 6.8, and is thus slightly lower than the pH range of 5 to 7 for the treated hard-boiled egg white. At such pH, even hydrochloric acid, which in its concentrated form is highly corrosive, is quite harmless and suitable.

The pH of fresh egg white varies from slightly below 8 in strictly fresh eggs up to approximately 9.5 in storage eggs. If the pH is adjusted to a point below the desired range as indicated above, the egg white will retain its normal white appearance after canning, but its texture will be increasingly tough and leathery. Above the desirable range of pH adjustment the color of the egg white will be affected and its texture will be so soft that it tends to break and crumble when subjected to a heat-sterilizing treatment. For best results the pH should be adjusted to an acid value above 5.5, but a satisfactory product is produced within a pH range of between 5 and 7. Below pH 5 the eggs also have an undesirable tendency of sticking together, and their taste is distinctly "acid," as in the well-known pickled eggs prepared by immersion in vinegar (about 6% acetic acid).

The following examples illustrate two specific methods in carrying out our invention. It will be understood, however, that the conditions given in these examples may be freely varied and other edible acids or edible acidic buffer systems may be substituted, as long as the result is the adjustment of the pH of the egg white to between 5 and 7.

EXAMPLE 1

A number of hard-boiled eggs, whose white had a pH of 9.25 and whose yolk had a pH of 6.9, were placed in a solution of 2½ grams of citric acid in a liter of water (pH of solution 2.9) for one hour at 100° F. The eggs were withdrawn from the solution, placed into lacquered cans, covered with boiling water, and the cans were sealed and heat-processed until sterile. One can was opened immediately after heat-processing and it was found that the pH of the egg white had dropped to 6.35 and that of the yolk to 6.25. Other cans were stored at 70° F. and 100° F., respectively. The pH of the eggs after storage in cans for periods from 1 to 3 months appears in the following table:

Table 1

| End of | White | | | Yolk | | |
|---|---|---|---|---|---|---|
| | 1st month | 2d month | 3d month | 1st month | 2d month | 3d month |
| at 70 °F | 5.45 | 5.98 | 5.65 | 5.62 | 6.10 | 5.73 |
| at 100° F | 5.60 | 6.03 | 5.80 | 5.65 | 6.24 | 5.80 |

At the end of the third month, the outside surface of the eggs was whitish. The eggs were not stuck together. A cross-section of the yolk showed a light yellow appearance. A cross-section of the white showed a slightly brownish discoloration. The flavor of the egg compared favorably with that of an untreated hard-boiled egg. The cans were unaffected.

EXAMPLE 2

Shelled hard-boiled eggs were placed in lacquered cans which were then filled with a solution of 2½ grams of acetic acid in a liter of water (pH of solution 3.5), sealed and heat-processed to sterilize. One can was opened immediately after heat-processing and the pH of the egg white was found to be 5.16 and that of the yolk 6.35. The pH of the eggs after storage in cans for periods from one to three months appears in the following table:

Table 2

| End of | White | | | Yolk | | |
|---|---|---|---|---|---|---|
| | 1st month | 2d month | 3d month | 1st month | 2d month | 3d month |
| at 70° F | 4.91 | 5.66 | 5.24 | 5.10 | 5.68 | 5.28 |
| at 100° F | 4.82 | 5.72 | 5.32 | 4.90 | 5.65 | 5.35 |

At the end of the third month, the eggs were not discolored, except that a cross-section of the white showed a slightly pinkish discoloration in the region nearest the yolk. Taste of the eggs compared favorably with that of untreated hard-boiled eggs. The cans were unaffected.

In a control experiment to determine whether pH of the egg white was a critical factor, shelled hard-boiled eggs were soaked in vinegar (a 6% solution of acetic acid having a pH of 2.7). The treated eggs and vinegar were placed in lacquered cans which were then evacuated and sealed. pH determination of the eggs after storage showed values of substantially less than 4:

Table 3

| End of | White | | | Yolk | | |
|---|---|---|---|---|---|---|
| | 1st month | 2d month | 3d month | 1st month | 2d month | 3d month |
| at 70° F | 3.35 | 3.85 | 3.70 | 3.25 | 3.74 | 3.60 |
| at 100° F | 3.62 | 3.89 | 3.63 | 3.48 | 3.70 | 3.60 |

The eggs became inedible upon one month's storage. The white was speckled with dark patches and the yolk assumed a light cream color. The quality of the eggs deteriorated after storage for two months and the egg white became very tough. At the end of the third month, the lacquer had come off the inside of the cans and part of it adhered to the eggs.

In an additional control experiment, the eggs were pickled in vinegar and stored in glass jars for three months. Conventional "pickled eggs" with a pronounced acid taste were obtained, which kept for two months, but during the third month, began sticking together. The pH of the egg whites was well below 4 and similar to the values shown in Table 3.

A principal difference between the conventional pickling of eggs in vinegar and the adjustment of the white of a hard-boiled egg to pH 5 to 7 with subsequent heat treatment in accordance with our invention is that the latter results in sterilization without substantially affecting the color, texture, or taste of the egg, while the product of conventional pickling is characterized by a very low pH and a distinct vinegar taste.

Our product requires no refrigeration and is acceptable for use in egg salad, potato salad and deviled eggs, or the eggs can be eaten as they come from the can. This process is well adapted to dispose of seasonal surplus in egg production and also enables eggs to be shipped to areas where refrigeration is not available and the transportation of shell eggs would be difficult or impossible.

We claim:

1. As a new article, a hard-boiled shelled egg, comprising hard-boiled heat sterilized egg white permeated with a member of the group consisting of edible acid and edible acidic buffer, and having a hydrogen ion concentration of a pH value between about 5.16 and about 6.8, said egg having a color, flavor and texture substantially equal to that of a freshly hard-boiled egg.

2. As a new article, a hard-boiled shelled egg, comprising hard-boiled heat sterilized egg white permeated with an edible acid and having a hydrogen ion concentration of a pH value between about 5.16 and about 6.8, said egg having a color, flavor and texture substantially equal to that of a freshly hard-boiled egg.

3. As a new article, a hard-boiled shelled egg, comprising hard-boiled heat sterilized egg white permeated with citric acid and having a pH value between about 5.16 and about 6.8, said egg having a color, flavor and texture substantially equal to that of a freshly hard-boiled egg.

4. As a new article, a hard-boiled shelled egg, comprising hard-boiled heat sterilized egg white permeated with acetic acid and having a pH value between about 5.16 and about 6.8, said egg having a color, flavor and texture substantially equal to that of a freshly hard-boiled egg.

5. As a new article, a hard-boiled shelled egg, comprising hard-boiled heat sterilized egg white permeated with a buffer system comprising edible acidic buffer and having a pH value between about 5.16 and about 6.8, said egg having a color, flavor and texture substantially equal to that of a freshly hard-boiled egg.

6. As a new article, a hard-boiled shelled canned egg, comprising hard-boiled heat-sterilized egg white of a pH value between about 5.16 and about 6.8, said egg being covered by an edible mildly acidic liquid of a pH value of between 4.6 and 6.8 enclosed in a hermetically sealed lacquered can; said egg being capable of prolonged storage at room temperatures without affecting the lacquering of said can, and said egg having after such storage a color, flavor, and texture substantially equal to that of a freshly hard-boiled egg.

7. As a new article, a hard-boiled shelled egg, comprising hard-boiled heat-sterilized egg white permeated with a buffer system comprising a citric acid - di-basic sodium phosphate acidic buffer system, said egg white having a pH value between about 5.16 and about 6.8, said egg having a color, flavor and texture substantially equal to that of a freshly hard-boiled egg.

8. As a new article, a hard-boiled shelled canned egg, comprising hard-boiled heat-sterilized egg white of a pH value of between about 5.16 and about 6.8, said egg being covered by a solution of acetic acid of a pH value of between 4.6 and 6.8, enclosed in a hermetically sealed lacquered can; said egg being capable of prolonged storage at room temperatures without affecting the lacquering of said can, and said egg having after such storage a color, flavor, and texture substantially equal to that of a freshly hard-boiled egg.

9. As a new article, a hard-boiled shelled canned egg, comprising hard-boiled heat-sterilized egg white of a pH value of between about 5.16 and about 6.8, said egg being covered by a solution of citric acid of a pH value of between 4.6 and 68, enclosed in a hermetically sealed lacquered can; said egg being capable of prolonged storage at room temperatures without affecting the lacquering of said can, and said egg having after such storage a color, flavor, and texture substantially equal to that of a freshly hard-boiled egg.

10. As a new article, a hard-boiled shelled canned egg, comprising hard-boiled heat-sterilized egg white of a pH value of between about 5.16 and about 6.8, said egg being covered by a solution of an edible mildly acidic buffer of a pH value of between 4.6 and 6.8, enclosed in a hermetically sealed lacquered can; said egg being capable of prolonged storage at room temperatures without affecting the lacquering of said can, and said egg having after such storage a color, flavor, and texture substantially equal to that of a freshly hard-boiled egg.

11. As a new article, a hard-boiled shelled canned egg, comprising hard-boiled heat-sterilized egg white of a pH value of between about 5.16 and about 6.8, said egg being covered by a solution of citric acid - di-basic sodium phosphate acidic buffer of a pH value of between 4.6 and 6.8, enclosed in a hermetically sealed lacquered can; said egg being capable of prolonged storage at room temperatures without affecting the lacquering of said can, and said egg having after such storage a color, flavor, and texture substantially equal to that of a freshly hard-boiled egg.

12. A method of preserving a hard-boiled shelled egg, comprising acidifying the white of said egg to a pH value of between about 5.16 and about 6.8, sealing said egg in a container, and heat-sterilizing said egg in said container.

13. A method of preserving a hard-boiled shelled egg, comprising treating said egg with a member of the group consisting of edible acid and edible acidic buffer until the white of said egg has an acid pH value of between about 5.16 and about 6.8, sealing said egg in a container, and heat-sterilizing said egg in said container.

14. A method of preserving a hard-boiled shelled egg, comprising treating said egg with an edible acid until the white of said egg has an acid pH value of between about 5.16 and about 6.8 sealing said egg in a container, and heat-sterilizing said egg in said container.

15. A method of preserving a hard-boiled shelled egg, comprising treating said egg with citric acid until the white of said egg has an acid pH value of between about 5.16 and about 6.8, sealing said egg in a container, and heat-sterilizing said egg in said container.

16. A method of preserving a hard-boiled shelled egg, comprising treating said egg with acetic acid until the white of said egg has an acid pH value of between about 5.16 and about 6.8, sealing said egg in a container, and heat-sterilizing said egg in said container.

17. A method of preserving a hard-boiled egg, comprising removing the shell of said egg, sealing said egg in a container filled with a solution of an edible acid of a concentration selected to establish and maintain an acid pH value of between about 5.16 and about 6.8 in the white of said egg, and heat-sterilizing said egg in said container.

18. A method of preserving a hard-boiled egg, comprising removing the shell of said egg, sealing said egg in a container filled with a solution of acetic acid of a concentration selected to establish and maintain an acid pH value of between about 5.16 and about 6.8 in the white of said egg, and heat-sterilizing said egg in said container.

19. A method of preserving a hard-boiled egg, comprising removing the shell of said egg, sealing said egg in a container filled with a weak acetic acid solution of approximately 2½ grams of acetic acid per liter, and heat-sterilizing said egg in said container.

20. A method of preserving a hard-boiled egg, comprising removing the shell of said egg, soaking said egg in an edible acid at a moderately elevated temperature of about 100° F. until the white of said egg has an acid pH value of between about 5.16 and about 6.8, removing said egg from said acid sealing said egg in a container, and heat-sterilizing said egg in said container.

21. A method of preserving a hard-boiled egg, comprising removing the shell of said egg, soaking said egg in citric acid at a moderately elevated temperature of about 100° F. until the white of said egg has an acid pH value of between about 5.16 and about 6.8, removing said egg from said citric acid, sealing said egg in a container, and heat-sterilizing said egg in said container.

22. A method of preserving a hard-boiled egg, comprising removing the shell of said egg, soaking said egg in a weak citric acid solution of a concentration of about 2½ grams of citric acid per liter at a moderately elevated temperature of about 100° F. for a time interval of the order of 1 hour, removing said egg from said acid solution, sealing said egg in a container, and heat-sterilizing said egg in said container.

23. A method of preserving a hard-boiled shelled egg, comprising treating the pH of the white of said egg with a buffer system comprising edible acidic buffer, until the pH of the egg white is adjusted to between about 5.16 and about 6.8 on the acid side, sealing said egg in a container, and heat-sterilizing said egg in said container.

24. A method of preserving a hard-boiled shelled egg, comprising treating the pH of the white of said egg with a citric acid - di-basic sodium phosphate buffer until the pH of the egg white is adjusted to between about 5.16 and about 6.8 on the acid side, sealing said egg in a container, and heat-sterilizing said egg in said container.

RICHARD D. TRELEASE.
GEORGE O. SAMPSON.
DALE V. ALSTRAND.

REFERENCES CITED

The following references are of record in the file of this patent:

"Dictionary of Cookery," 1877 by Cassell, page 201, article entitled "Eggs, Pickled."

"The White House Cook Book," 1929, by F. L. Gillette, page 208, article entitled "Pickled Eggs."